Patented Aug. 6, 1940

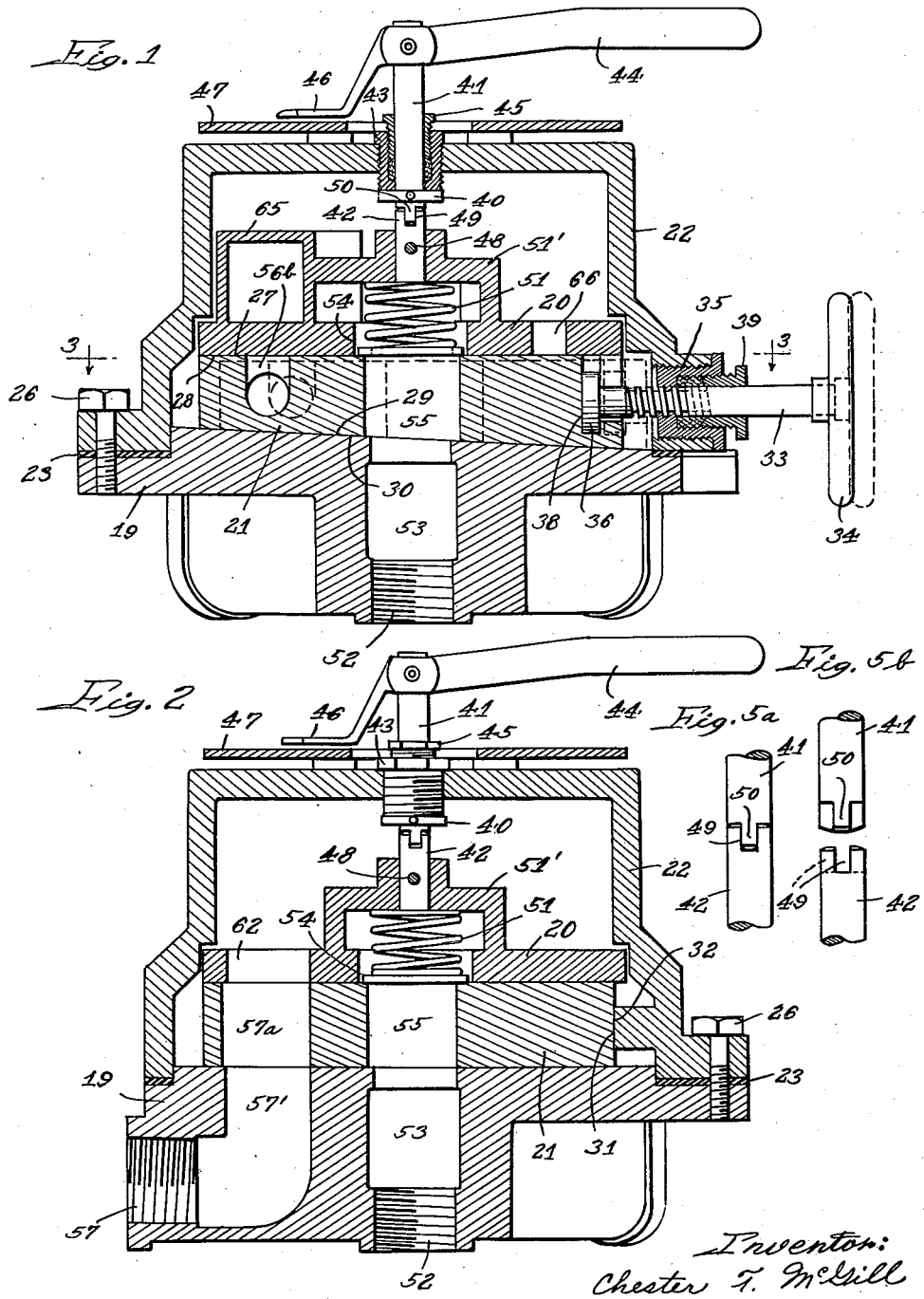

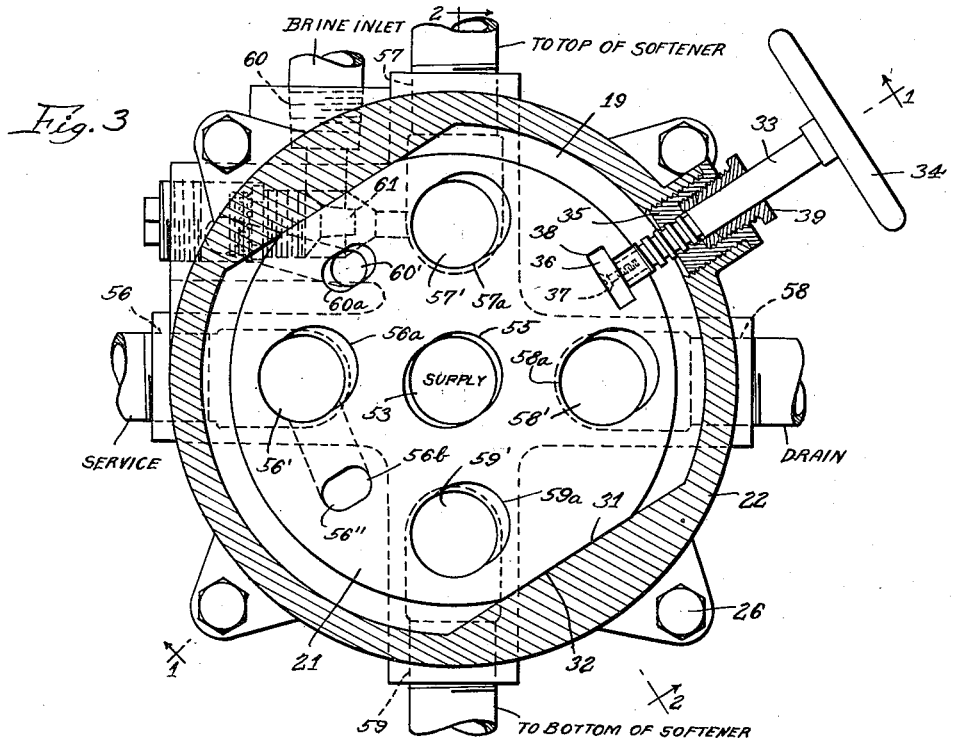
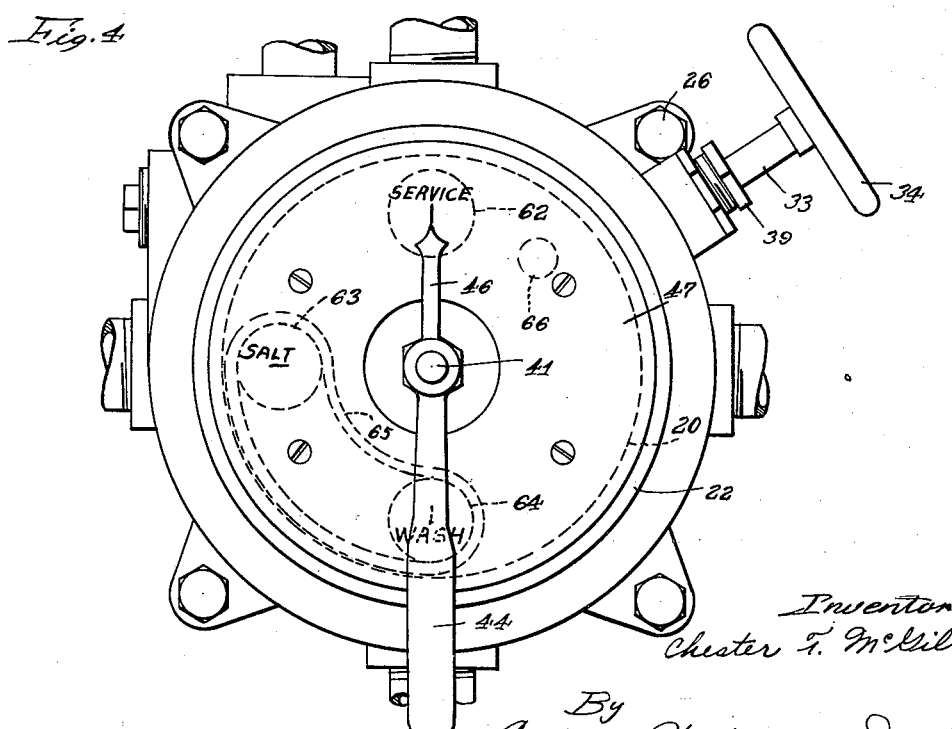

2,209,994

UNITED STATES PATENT OFFICE 2,209,994

ROTARY TYPE MULTIPORT VALVE

Chester T. McGill, Elgin, Ill.

Application September 22, 1938, Serial No. 231,145

16 Claims. (Cl. 251—84)

This invention relates to rotary type multiport valves especially designed and adapted for use with base exchange water softeners, filters, etc.

Numerous designs of multiport valves have been made where the rotor is arranged to be lifted, turned, and re-seated on a rubber gasket or gaskets, but such valves have invariably been complicated and expensive to manufacture and were subject to certain serious objections. It is the principal object of my invention to provide rotary type multiport valves of simpler and more economical construction, avoiding so far as possible the objections to the previous designs.

A salient feature of the valve of my invention is the provision of a ported intermediate sealing member between the ported valve members, shiftable with respect to said members from one position to another. In the present case, this intermediate member cooperates with a rotor and stator and is movable transversely for wedging sealing engagement between the members after the rotor has been shifted from one operative position to another, said intermediate member being arranged to be retracted subsequently so as to free the parts whenever the rotor is to be shifted again to some other position.

An important feature in connection with the transversely shiftable intermediate member is the provision of screw-threaded means for moving the member with considerable force and yet with no special exertion on the part of the operator toward and away from wedging sealing engagement between the ported valve members.

Other important features are the provision in a valve of the kind just mentioned of spring means acting between the rotor and the intermediate member tending normally to separate the same, whereby to avoid sticking of these parts and consequent interference with the turning of the rotor from one position to another and the provision of a central abutment for the rotor with relation to which the rotor is universally shiftable so as to insure uniformly good engagement of the complete area of the face of the rotor with the intermediate member when the latter is wedged in place.

The invention will be better understood as reference is made in the following description to the accompanying drawings, wherein—

Figs. 1 and 2 are vertical sections through a valve made in accordance with my invention, these views being taken on the broken lines 1—1 and 2—2, respectively, of Fig. 3;

Fig. 3 is a horizontal section on the line 3—3 of Fig. 1;

Fig. 4 is a plan view of the valve;

Figs. 5a and 5b are isolated views on a larger scale illustrating the detachable connection between the operating stem and the stem on the rotor.

The same reference numerals are applied to corresponding parts throughout the views.

Referring first to Figs. 1 to 4, the reference numeral 19 designates the stator or hollow body part of the valve, and 20 the rotor which is disposed with the intermediate sealing member 21 under the cover 22. 23 is a gasket sealing the joint between the cover 22 and stator 19, the cover being suitably secured to the stator by means of bolts 26 which when tightened serve to compress the gasket to provide a water-tight joint. The rotor 20 has a horizontal flat bottom face 27 for engagement with the horizontal flat top face 28 of the intermediate member 21. The latter is wedge-shaped, its bottom face 29 being at an acute angle to its top face 28 for wedging sealing engagement between the stator 19 and rotor 20. As clearly appears in Fig. 1, the top face 30 of the stator 19 is inclined relative to the horizontal at the same acute angle as the bottom face 29 of the intermediate member 21 and in the same direction for sealing engagement therewith when the intermediate member 21 is wedged in place. The intermediate member 21 is guided for its transverse movement with respect to the stator 19 and rotor 20 by engagement of diametrically opposed parallel flat sides 31 on the intermediate member with diametrically opposed flat parallel surfaces 32 on the inside of the cover 22. A screw 33 operable by a hand-wheel 34 is threaded in a plug 35 inserted in the wall of the cover 22 and has a cylindrical head 36 suitably secured as by means of a screw 37 on the squared inner end of the screw 33 to provide a swivel operating connection between the screw and the intermediate member 21. The head 36 is rotatably received in a slot 38 provided therefor in the member 21 to complete the connection between the screw 33 and member 21. The packing nut 39 compresses packing material around the smooth protruding shank of the screw 33 to prevent leakage of water from the cover. It will be understood that the member 21 may be of brass or bronze, while the stator 19 and rotor 20 may be of cast iron, in which event the parts will form a good water-tight connection when the intermediate member 21 is wedged in place. The intermediate member may also be made of micarta, hard rubber, or any other material suitable for the purpose. In the wedging of the intermediate member 21 in place between the stator 19 and rotor 20, the upward trust imposed on the rotor is assumed by a collar 40 on the operating stem 41 centrally disposed with respect to the rotor and detachably connected with a stem 42 mounted in the center of the rotor. By having this central abutment in relation to which the rotor 20 is universally tiltable, I am assured of uniformly good sealing engagement of the entire area of the bottom face 27 of the rotor with the top face 28 of the intermediate member 21. The collar 40 bears against the bottom of a plug 43 threaded in the top wall of the cover 22 through which the stem 41 projects for connection with the operating handle 44. A packing nut 45 compresses packing in the plug 43 around the stem 41 to prevent leakage of water from the cover. A pointer 46 is provided on the handle 44 sweeping over an index plate 47 mounted on top of the cover 22 to indicate the position of the valve. Thus, in Fig. 4, the pointer indicates the valve is in service position, and it will be noticed that there are two other positions marked on the index plate for salt wash and backwash at 90° and 180° removed from the service position. The stem 42 which is shown as fastened by means of a pin 48 to the rotor 20 has its upper end slotted crisscross, as indicated at 49, to receive with a loose sliding fit the cross-shaped lower end 50 of the stem 41, whereby the stem 41 keeps the rotor 20 centralized with reference to the stator 19 and intermediate member 21, but the rotor is nevertheless free to adjust itself with respect to the stem 41 in seating on the top of the intermediate member 21. A coiled compression spring 51 acting between a yoke 51' on the rotor 20 and intermediate member 21 tends normally to separate these parts so that there will be no tendency for the intermediate member to stick onto the rotor when the intermediate member is backed away from the operative position. In this case, the central location of the spring 51 is important because it exerts uniform thrust in the direction of separating the members 20 and 21.

The stator or body 19 has a central axial threaded hole 52 communicating with the central pressure or fluid supply port 53 which in turn communicates with the inside of the cover 22 through the central openings 54 and 55 provided in the rotor 20 and intermediate member 21, respectively. The stator has four radial threaded holes in equally circumferentially spaced relation numbered 56 to 59, and these communicate with ports numbered 56' to 59', respectively, opening to the top face 30 of the stator under the cover 22. When the valve is used in connection with a water softener, the holes 57 and 59 have pipe connections establishing communication therefor with opposite ends of a softener tank, as indicated by the legends "to top of softener" and "to bottom of softener" in Fig. 3. The holes 56 and 58 receive pipe connections extending to the service system and drain, respectively, as also indicated by the legends "service" and "drain" in Fig. 3. Still another threaded hole 60 in the stator 19 next to the hole 57 is adapted to receive a pipe connection for delivering brine to the valve from a brine tank, as indicated by the legend "brine inlet" in Fig. 3. Associated with the hole 60 is a port 60' in the top face 30 of the stator for delivering water under pressure to the brine ejector nozzle 61 disposed transversely and in brine ejecting relation to the hole 60 to discharge water and brine mixture into the port 57'. An auxiliary port 56'' is provided in the stator next to and in communication with the port 56' and opening to the top face 30 of the stator. Now, the intermediate sealing member 21 has ports numbered 56a to 60a communicating with the ports 56' to 60' in the stator and also a port 56b communicating with the port 56'' in the stator, all of the ports in the intermediate member 21 being elongated sufficiently in a direction parallel to the operation of the screw 33 to allow for the small amount of transverse movement of the intermediate member in moving to and from operative position, and full communication being afforded through the member 21 between the stator 19 and rotor 20 in all positions of transverse adjustment of the intermediate member 21. The arrangement of the ports provided in the rotor 20 is indicated in dotted lines in Fig. 4, there being three large ports 62, 63, and 64 90° apart and disposed on the same radius as the ports 56'—59' in the stator and of the same diameter as said ports. An arcuate boss 65 cast integral with the rotor 20 establishes communication between the ports 63 and 64. A small port 66 is provided about 45° removed from the port 62 and on the same radius as the port 60' in the stator and of the same diameter as said port, approximately.

In operation, assuming that the valve shown in Figs. 1 to 4 is connected to a water softener and brine tank, as above stated, the following circuit is established through the valve in its service position, the parts being shown in that position in the drawings: The incoming raw water from the supply line enters the valve through the supply port 53 and communicating ports 54 and 55 in the rotor 20 and intermediate member 21, respectively. The raw water leaves the valve through communicating ports 57', 57a and 62, and flows into the top of the softener tank for passage downwardly through the bed of water softening material. The softened water leaving the bottom of the softener tank re-enters the valve through the communicating ports 59' and 59a and flows through ports 64 into the arcuate boss 65 from which it flows through port 63 and communicating ports 56' and 56a to the service system. This softening operation continues until the bed of water softening material in the softener requires regeneration, whereupon the operator turns the handle 44 through 180° to the backwash position. During backwash the incoming raw water from port 53 and communicating ports 54 and 55 is discharged from the valve through the port 62 and communicating ports 59' and 59a into the bottom of the softener tank for passage upwardly through the bed of water softening material, so as to break up the bed and carry off from the top of the bed whatever sediment has accumulated thereon during softening operation. The water leaving the top of the softener tank re-enters the valve through communicating ports 57' and 57a and passes through the arcuate boss 65 and leaves the valve through communicating ports 58' and 58a to flow to the sewer or other drain receptacle. During the backwash operation, raw water can be by-passed to the service system through the port 66 which registers with the port 56b. As soon as the softener has been backwashed sufficiently, the handle 44 is shifted through 90° in a clockwise direction to the salt wash position. During salt wash the incoming raw water can be delivered directly to the service system from the port 62 which registers with the port 56a. At the same time, the port 66 delivers raw water through the registering port 60a to the nozzle 61, and the water discharging from the nozzle 61 into the port 57' siphons brine from the brine tank through the hole 60, and the water mixed with brine flows into the top of the softener tank for passage downwardly through the bed of water softening material to regenerate the same. The spent brine along with released calcium and magnesium leaving the bottom of the softener tank re-enters the valve through the communicating ports 59' and 59a and flows through the arcuate boss 65 into communicating ports 58' and 58a and out to the drain. The salt wash is continued until the level of the brine in the brine tank drops to a predetermined point, whereupon a brine valve is closed to prevent any further flow of brine from the tank, but the raw water flow is continued so as to rinse the bed of water softening material and clear out the brine and released calcium and magnesium. The rinse flow is continued until the water going to the drain tests soft, whereupon the handle 44 may be turned 90° in a clockwise direction back to the service position to resume the softening operation.

It is believed the foregoing description conveys a good understanding of the objects and advantages of my invention. The appended claims have been drawn with a view to covering all legitimate modifications and adaptations.

I claim:

1. In a multiplate multiport type valve, a plural ported body member, a plural ported rotary plate member, and a plural ported tapered sealing member adapted to be wedged between the other members to establish communication between the body and plate members, the ports in the three members being in circumferentially spaced relation with respect to the center of the rotary plate member, the rotary plate member being rotatable through substantially a complete turn to establish different fluid circuits for the ports in the body member through the ports in the other members in different positions of rotation of the rotary plate member, means for moving the sealing member to and from sealing position between the body and plate members, and means for rotating the plate member from one operative position to another.

2. In a multiplate multiport type valve, a plural ported body member, a plural ported movable plate member, and a plural ported tapered sealing member adapted to be wedged between the other members to establish communication between the body and plate members, said sealing member serving to establish different fluid circuits for the ports in the body member through the ports in the other members in different positions of the plate member, means for moving the sealing member to and from sealing position between the body and plate members, and means for moving the plate member from one operative position to another.

3. The combination in a multiplate multiport type valve of a stator member carrying a housing and having a plurality of ports at least one of which communicates with the inside of said housing a rotor member in the housing having a plurality of ports adapted to register with the first-mentioned ports in different positions of the rotor and having at least one of its ports open to the inside of said housing, a tapered plural ported intermediate sealing member movable transversely with respect to the rotor and stator members to and from an operative position wedgingly engaged between said rotor and stator members affording sealed communication between the ports of said members, the ports in the three members being in circumferentially spaced relation with respect to the center of the rotor member, the rotor member being rotatable through substantially a complete turn to establish different fluid circuits for the ports in the stator member through the ports in the other members and housing in different positions of rotation of the rotor member, means for communicating reciprocatory movement to the sealing member, and means for rotating the rotor member.

4. A rotary plate type valve as set forth in claim 3, including spring means tending to separate the rotor member and intermediate member.

5. A rotary plate type valve as set forth in claim 3, wherein the last-mentioned means includes a flexible connection with the center of the rotor member, whereby said rotor member is adapted to adjust its position relative to the intermediate member when the latter is wedged in place, said valve further including spring means acting between the center of the rotor member and the intermediate member tending normally to separate the same.

6. The combination in a multiplate multiport type valve of a stator member having a flat face inclined at an acute angle to the axis of rotation of the rotor member and provided with a plurality of ports, a cover on the stator member enclosing the ported inclined face thereof, at least one of the ports in the stator member communicating with the inside of said cover, a wedge-shaped plural ported sealing member having a flat rotor engaging surface normal to said axis of rotation and a flat inclined stator engaging surface inclined in the same direction and at the same acute angle as the face of the stator and adapted slidably to engage the same, means for moving said sealing member along the inclined surface of the stator, a plural ported rotor member having a flat surface normal to the rotor's axis of rotation slidably engaging the adjacent flat surface of the sealing member and having at least one port opening to the inside of said cover, the ports in the stator, sealing, and rotor members being all in circumferentially spaced relation with respect to the center of the rotor member, the ports in the sealing member establishing different communication between the ports in the stator and rotor members in different positions of rotary adjustment of the rotor member when the sealing member is wedged between the stator and rotor members, and means for turning the rotor member.

7. A valve as set forth in claim 6, including spring means acting between the center of the rotor member and the center of the top of the sealing member tending normally to separate the same.

8. In a plate type valve, the combination of a body member having one or more ports provided therein, a cover member enclosing the ported face of said body member, a rotary plate member having ports provided therein in equally radially spaced relation to the center thereof, any one of which is adapted to be placed in register with a port in the body member, means rotatably mounted on the cover in coaxial relation with the plate member and flexibly connected therewith for rotatably adjusting the plate member from outside the cover, combined stuffing box and bearing means on the cover for said last-mentioned means arranged to assume axial thrust when the plate member is urged toward its rotating means, a ported wedge-shaped sealing member movable transversely with respect to and between the body member and plate member, and means for moving said sealing member in either direction.

9. A valve as set forth in claim 8 including spring means tending normally to separate the wedge-shaped sealing member from the rotary plate member.

10. A valve as set forth in claim 8, including spring means acting between the center of the plate member and the wedge-shaped sealing member tending normally to separate the same.

11. A valve as set forth in claim 8, including spring means acting between the wedge-shaped sealing member and one of said body member and rotary plate member tending normally to separate the same.

12. A multiplate multiport type valve, as set forth in claim 1, including spring means tending to separate the sealing member from at least one of the other members.

13. A multiplate multiport type valve, as set forth in claim 2, including spring means tending to separate the sealing member from at least one of the other members.

14. A multiplate multiport type valve, as set forth in claim 3, including spring means tending to separate the sealing member from at least one of the other members.

15. A multiplate multiport type valve, as set forth in claim 3, wherein the sealing member has flats provided in parallel relation on diametrically opposite sides and wherein the housing has parallel guides on diametrically opposite sides thereof for cooperation with said flats to guide the sealing member to and from operative position.

16. A multiplate multiport type valve, as set forth in claim 6, wherein the sealing member has flats provided in parallel relation on diametrically opposite sides and wherein the cover has parallel guides on diametrically opposite sides thereof for cooperation with said flats to guide the sealing member to and from operative position.

CHESTER T. McGILL.